(12) United States Patent
Greene et al.

(10) Patent No.: US 12,539,639 B2
(45) Date of Patent: Feb. 3, 2026

(54) CHAIN SAW

(71) Applicant: BLACK & DECKER INC., New Britain, CT (US)

(72) Inventors: Nathan Vincent Greene, Baltimore, MD (US); Marina Aleksandrovna Rubanchenko, Bel Air, MD (US); Jaren Austin Passey, Baltimore, MD (US); Conor Christopher Hantzschel, West Islip, NY (US)

(73) Assignee: BLACK & DECKER INC., New Britain, CT (US)

( * ) Notice: Subject to any disclaimer, the term of this patent is extended or adjusted under 35 U.S.C. 154(b) by 537 days.

(21) Appl. No.: 17/723,308

(22) Filed: Apr. 18, 2022

(65) Prior Publication Data

US 2023/0330888 A1    Oct. 19, 2023

(51) Int. Cl.
*B27B 17/00* (2006.01)
*A01G 3/08* (2006.01)
*B27B 17/02* (2006.01)
*B27G 19/00* (2006.01)

(52) U.S. Cl.
CPC .......... *B27B 17/0008* (2013.01); *A01G 3/086* (2013.01); *B27B 17/02* (2013.01); *B27G 19/003* (2013.01)

(58) Field of Classification Search
CPC .... A01G 3/086; B27B 17/0008; B27B 17/02; B27G 19/003
USPC ......................................................... 30/383
See application file for complete search history.

(56) References Cited

U.S. PATENT DOCUMENTS

| | | | |
|---|---|---|---|
| 3,808,684 A | | 5/1974 | Ludwig |
| 4,583,291 A | * | 4/1986 | Pilatowicz .............. B27B 17/08 30/383 |
| 4,785,540 A | | 11/1988 | Arvidsson |
| 4,974,325 A | | 12/1990 | Haertlein |
| 5,685,080 A | | 11/1997 | Amano et al. |
| 5,687,483 A | | 11/1997 | Neubert et al. |

(Continued)

FOREIGN PATENT DOCUMENTS

| | | | | |
|---|---|---|---|---|
| CN | 111376351 A | * | 7/2020 | ............. B27B 17/00 |
| CN | 214338807 U | * | 10/2021 | |

(Continued)

OTHER PUBLICATIONS

Translation CN-114193557-A (Year: 2025).*
Translation CN-111376351-A (Year: 2025).*
Translation CN-214338807-U (Year: 2025).*

*Primary Examiner* — Nhat Chieu Q Do
(74) *Attorney, Agent, or Firm* — Mannava & Kang, P.C.

(57) ABSTRACT

According to examples, a power tool may include a chassis and a guide bar mounted to the chassis, the guide bar having a central axis. The power tool may also include a handle attached to the chassis above the central axis of the guide bar and a motor housed within the chassis to drive a chain around the guide bar, in which the motor is positioned beneath the central axis of the guide bar and a central axis of the motor is at a certain angle with respect to the central axis. The handle, the motor, and the battery pack mount may be positioned with respect to the chassis to cause the power tool to substantially be balanced in both lateral and longitudinal directions about a location near the trigger mechanism when the battery pack is mounted to the battery pack mount.

16 Claims, 8 Drawing Sheets

(56) References Cited

U.S. PATENT DOCUMENTS

| | | |
|---|---|---|
| D389,026 S | 1/1998 | Amano et al. |
| 6,105,263 A | 8/2000 | Stones et al. |
| D536,590 S | 2/2007 | Busschaert |
| D560,456 S | 1/2008 | Gieske et al. |
| D575,605 S | 8/2008 | Yamamoto et al. |
| D606,829 S | 12/2009 | Tinius |
| 8,032,990 B2 | 10/2011 | Shinma et al. |
| 8,136,257 B2 | 3/2012 | Lau |
| 8,166,614 B2 | 5/2012 | Martin |
| 8,186,018 B2 | 5/2012 | Martin |
| 8,528,217 B2 | 9/2013 | Kondo et al. |
| D805,869 S | 12/2017 | Baxter et al. |
| 10,130,043 B1 | 11/2018 | McNamara |
| D899,881 S | 10/2020 | Takahashi et al. |
| 2007/0240892 A1 | 10/2007 | Brotto et al. |
| 2017/0239835 A1 | 8/2017 | Ebner |
| 2018/0084731 A1 | 3/2018 | Harris |
| 2018/0133818 A1 | 5/2018 | Mang et al. |
| 2023/0191646 A1 * | 6/2023 | Yamaoka ............... B27B 17/00 30/123.4 |
| 2023/0211519 A1 * | 7/2023 | Markus ................... B27B 17/12 30/123.4 |
| 2023/0321738 A1 * | 10/2023 | Li ......................... B27G 19/003 83/78 |

FOREIGN PATENT DOCUMENTS

| | | | |
|---|---|---|---|
| CN | 114193557 A * | 3/2022 | ........... B27G 19/003 |
| DE | 2909777 A1 | 9/1980 | |
| DE | 3114906 A1 | 10/1982 | |
| DE | 2816485 C2 | 9/1983 | |
| DE | 202009002205 U9 | 1/2010 | |
| EP | 2492070 A1 | 8/2012 | |
| EP | 1400317 B2 | 3/2014 | |
| JP | 2014061659 A | 4/2014 | |
| WO | 2016127450 A1 | 8/2016 | |

* cited by examiner

CHAIN SAW

FIELD

The present disclosure relates to a power tool. In particular, the present disclosure relates to a battery-powered power tool, e.g., a cordless pruning chainsaw, in which a handle and a motor of the power tool are arranged with respect to a guide guard of the power tool to cause the power tool to substantially be balanced in both longitudinal and lateral directions about a certain location of the power tool.

BACKGROUND

Cordless power tools, such as chainsaws, pruning chainsaws, edging devices, and the like, are implemented in a number of different tasks including those that are performed outdoors. These tasks include trimming branches, trimming hedges, pruning trees, and tree felling, to name a few. Cordless power tools typically include a detachable self-contained power source (e.g., a battery pack) that is to provide electrical energy to an electric drive motor in the cordless power tools. The cordless power tools may also include handles for operators to grip and manipulate the cordless power tools. The electric drive motor and the battery pack may be of significant weight to provide sufficient power and duration for various operations, thereby increasing the overall weight of the cordless power tools.

SUMMARY

This section provides a general summary of the disclosure, and is not a comprehensive disclosure of its full scope or all of its features.

According to embodiments disclosed herein, a power tool may include a chassis and a guide bar mounted to the chassis, in which the guide bar has a central axis. The power tool may also include a handle attached to the chassis above the central axis of the guide bar and a motor housed within the chassis to drive a chain around the guide bar. The motor may be positioned beneath the central axis of the guide bar and a central axis of the motor may be at a certain angle with respect to the central axis of the guide bar.

According to embodiments disclosed herein, a chainsaw may include a chassis and a guide bar mounted to the chassis. A central axis of the guide bar may extend along a longitudinal direction, in which the guide bar is to guide a chain. The chainsaw may also include a handle attached to the chassis, in which a primary handle portion of the handle extends at a first angle with respect to the central axis of the guide bar. The chainsaw may further include a motor housed within the chassis, in which the motor is to drive the chain around the guide bar. The motor may include a rotor having an axis of rotation that extends at a second angle with respect to the central axis of the guide bar and may be positioned beneath the central axis of the guide bar and the handle is positioned above the central axis of the guide bar. The chainsaw may still further include a battery pack mount formed on the handle distally from the guide bar.

According to embodiments disclosed herein, a pruning chainsaw may include a chassis, a chain, and a guide bar mounted to the chassis, in which a central axis of the guide bar extends along a longitudinal direction. The pruning chainsaw may also include a handle attached to the chassis, in which a primary handle portion of the handle extends at a first angle with respect to the central axis of the guide bar. The pruning chainsaw may further include a motor housed within the chassis, in which the motor is to drive the chain around the guide bar. The motor may include a rotor having an axis of rotation that extends at a second angle away from the central axis of the guide bar. In addition, the motor may be positioned beneath the central axis of the guide bar and the primary handle portion of the handle may be positioned above the central axis of the guide bar. The pruning chainsaw may further include a battery pack mount formed on the handle distally from the guide bar and a battery pack releasably mounted to the battery pack mount.

BRIEF DESCRIPTION OF THE DRAWINGS

Features of the present disclosure are illustrated by way of example and not limited in the following figure(s), in which like numerals indicate like elements, in which.

DETAILED DESCRIPTION

Generally speaking, cordless power tools, such as battery-powered chainsaws and battery-powered pruning chainsaws, are widely used in gardening and other outdoor activities by professional and non-professional operators. The operators may use the cordless power tools to prune trees and bushes, to cut up limbs of trees, and the like. In many instances, during pruning operations, the operators may use the cordless power tools to prune limbs that extend generally horizontally from a trunk of a tree. In this regard, in pruning operations, a large number of cuts may be made through approximately vertical movements of the cordless power tools. The approximately vertical movements may include either or both of undercuts and overcuts. In many instances, the cordless power tools are not balanced in both longitudinal and lateral directions. As a result, operators may be required to apply relatively large amounts of force in certain directions in addition to the vertical movements. This may result in increased or the earlier onset of operator fatigue during use of the cordless power tools.

Additionally, the cordless power tools may include components that may block an operator's line of sight along a upper section of the cordless power tools. This may make it difficult for the operator to accurately align a chain of a cordless power tool with a tree limb during a vertical cutting movement.

Disclosed herein are cordless power tools, such as battery-powered chainsaws and, particularly, battery-powered pruning chainsaws, that may have enhanced lateral and longitudinal balance about certain locations of the power tools. In some examples, the power tools may substantially be balanced in both the lateral and longitudinal directions when battery packs are mounted to the power tools. As discussed herein, the components of the power tools may be arranged with respect to each other in certain positions and angles that may result in the enhanced balance of the power tools. The arrangements of the components of the power tools may also result in an improved line of sight over the tops of the power tools.

According to examples disclosed herein, a power tool, which may also be termed a chainsaw or a pruning chainsaw, may include a guide bar for a chain, e.g., a cutting chain. The guide bar may be mounted to a front of the chassis and the guide bar may have a central axis. The power tool may also include a handle attached to the chassis above the central axis of the guide bar. The power tool may further include a motor to drive the chain around the guide bar. The motor may be housed within the chassis and may be positioned beneath the central axis of the guide bar and a central axis of the motor may be at a certain angle with respect to the central axis of the guide bar. In other words, the central axis of the motor may be at an angle that is greater than zero and less than 90 degrees with respect to the central axis of the guide bar.

As disclosed herein, the power tool may include a trigger mechanism movably mounted to the handle. In some examples, the handle, the motor, the battery pack may be positioned with respect to the chassis to cause the power tool to substantially be balanced in both the lateral and longitudinal directions about a location near the trigger mechanism. By positioning the components of the power tool in locations and angles as disclosed herein, the center of mass may also be located at or below the trigger mechanism. A result of the substantial lateral and longitudinal balance and center of mass location may cause stability of the power tool and operator control of the power tool may be promoted. Additionally, operator fatigue resulting from use of the power tool may be reduced or minimized.

Before continuing, it is noted that as used herein, the terms "includes" and "including" mean, but are not limited to, "includes" or "including" and "includes at least" or "including at least." The term "based on" means, but is not limited to, "based on" and "based at least in part on."

Figure 1:
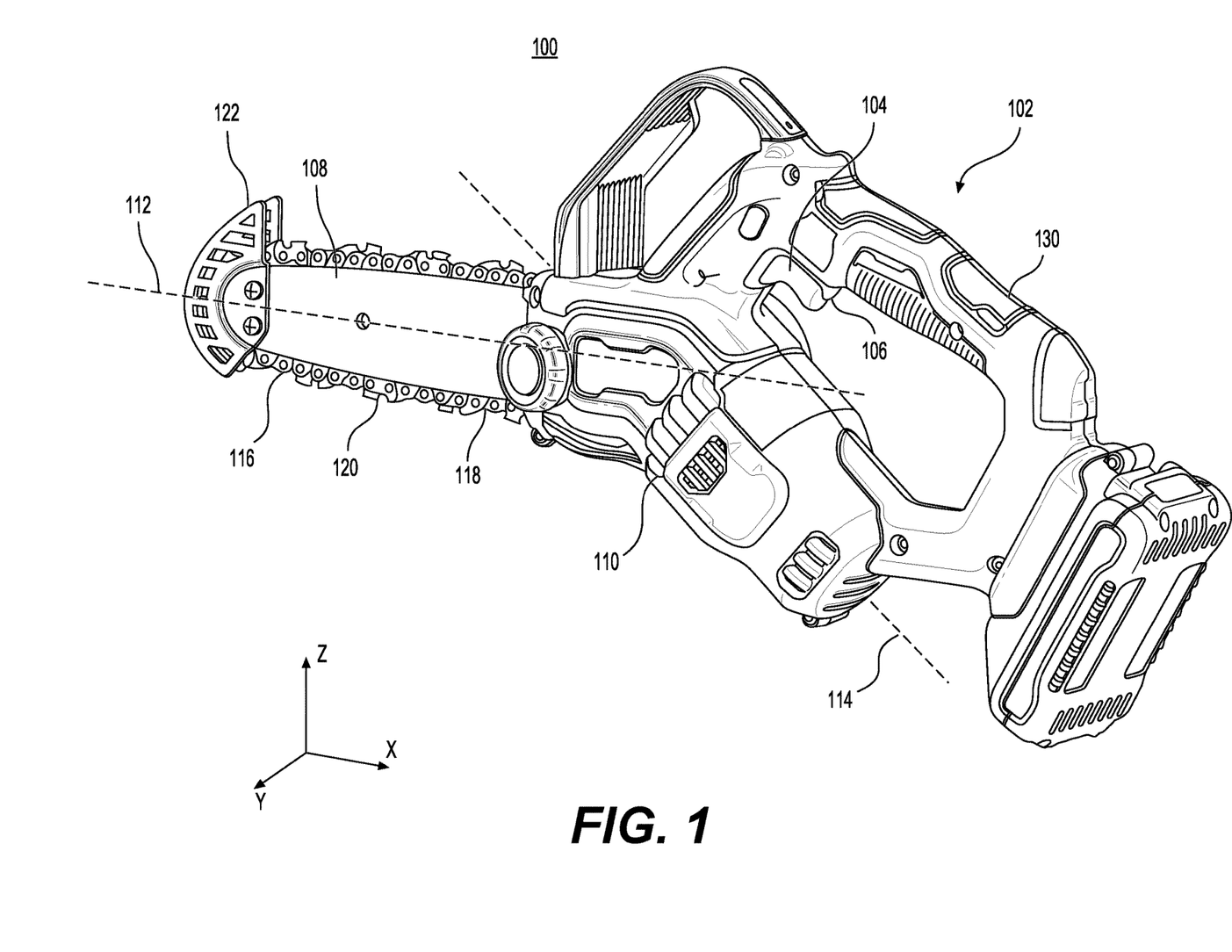
FIG. 1 shows a rear perspective view of a power tool having an enhanced lateral and longitudinal balance about a certain location of the power tool, according to an embodiment of the present disclosure.

With reference first to FIG. 1, there is shown a rear perspective view of a power tool 100 having an enhanced lateral and longitudinal balance about a certain location of the power tool 100, according to an embodiment of the present disclosure. It should be understood that the power tool 100 depicted in FIG. 1 may include additional components and that some of the components described herein may be removed and/or modified without departing from the scope of the power tool 100 disclosed herein.

The power tool 100 may be a cordless power tool such as a chainsaw, and particularly, a cordless pruning chainsaw. Generally speaking, the components of the power tool 100 may be configured and arranged to cause the center of mass of the power tool 100 to be located at a certain location of the power tool 100. The certain location of the power tool 100 may be a location that is at or below a primary handle portion 130 of the handle 102. For instance, the certain location may be a location near a trigger mechanism 104 provided on the primary handle portion 130 of the power tool 100. By way of particular example, the certain location may be adjacent to a bottom portion 106 of the trigger mechanism 104. As discussed herein, the handle 102 and a motor of the power tool 100 may be located in certain positions and orientations with respect to a guide bar 108 of the power tool 100. By positioning the center of mass of the power tool 100 at the certain location, e.g., 106, stability and operator control of the power tool 100 may be promoted. Particularly, for instance, lateral and longitudinal balance of the power tool 100 may be enhanced, which may enhance operability of the power tool 100 while reducing operator fatigue. In some examples, the balance of the power tool 100 may be enhanced when a battery pack is mounted to a battery pack mount of the power tool 100.

As shown in FIG. 1, the handle 102 may be attached to a chassis 110 of the power tool 100 above a central axis (denoted by dashed line 112) of the guide bar 108. In addition, the motor, which is housed within the chassis 110, may be positioned beneath the central axis 112 of the guide bar 108. In other words, the handle 102 and more particularly, the primary handle portion 130 of the handle 102, and the motor may be positioned on opposite sides of the central axis 112 of the guide bar 108. The motor may also be angled with respect to the central axis of the guide bar 108. That is to say that the central axis (denoted by dashed line 114) of the motor may be angled with respect to the central axis 112 of the guide bar 108. Throughout this disclosure, the direction in which the central axis 112 of the guide bar 108 extends may be denoted as an X axis (X direction) and directions perpendicular to the X axis may respectively be denoted as a Y axis (Y direction) and a Z axis (Z direction). In this regard, the power tool 100 may substantially be laterally balanced about the X axis and may substantially be longitudinally balanced about the Y axis at a certain location with respect to the power tool 100. According to examples, the power tool 100 may be deemed to be substantially laterally balanced about the certain location when the certain location is less than about 20 mm from the center of mass of the power tool 100 in the longitudinal direct. Likewise, the power tool 100 may be deemed to be substantially longitudinally balanced about the certain location when the certain location is less than about 20 mm from the center of mass of the power tool 100 in the lateral direction. As a result, an operator may exert a relatively small amount of torque on the handle 102 about the X axis and the Y axis to keep the power tool 100 in an intended operating position, e.g., movement of the power tool 100 in the vertical direction (Z axis).

Figure 2A:
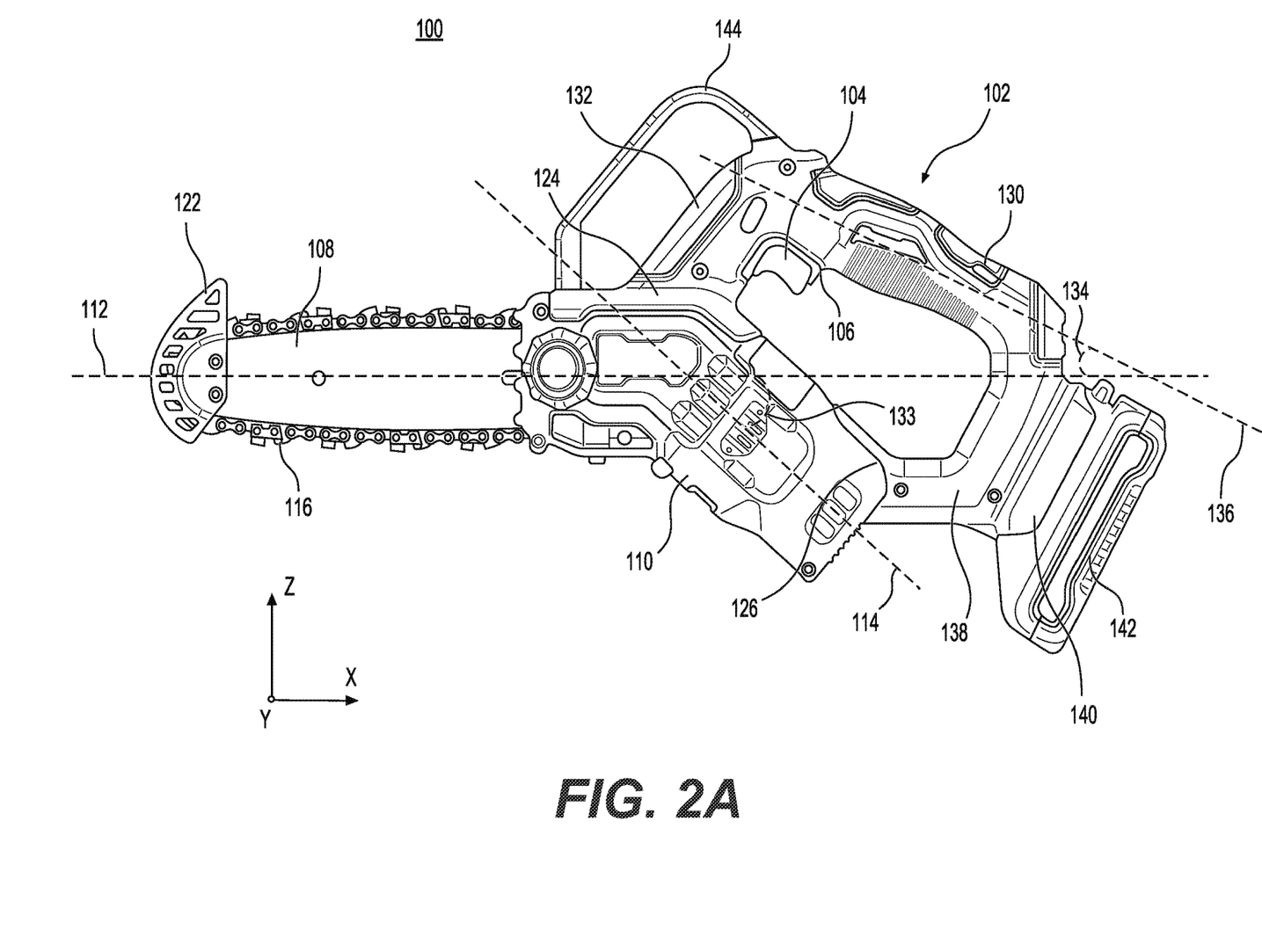
FIG. 2A depicts a side elevation view of the power tool depicted in FIG. 1, according to an embodiment of the present disclosure.

Reference is now made to FIGS. 1 and 2A. FIG. 2A depicts a side elevation view of the power tool 100 depicted in FIG. 1, according to an embodiment of the present disclosure. As shown in FIGS. 1 and 2A, in addition to the components described above, the power tool 100 may include a chain 116 that is to be driven around the guide bar 108 during operation of the power tool 100. The chain 116 may be formed of a plurality of links 118 on which cutting teeth 120 are formed. The cutting teeth 120 may cut through objects such as tree limbs and trunks during operation of the power tool 100. In some examples, the guide bar 108 and the chain 116 may be formed of a metal, such as steel, stainless-steel alloy, and/or the like.

The guide bar 108 may be mounted to the chassis 110. In some examples, the guide bar 108 may be mounted directly to the chassis 110, while in other examples, the guide bar 108 may be mounted to the chassis 110 through a bracket or other hardware mechanism. In any of these examples, the guide bar 108 may be mounted to the chassis 110 through use of mechanical fasteners, adhesives, welds, and/or the like. In addition, the chassis 110 may include openings through which the chain 116 may be driven into and out of the chassis 110.

Figure 2B:
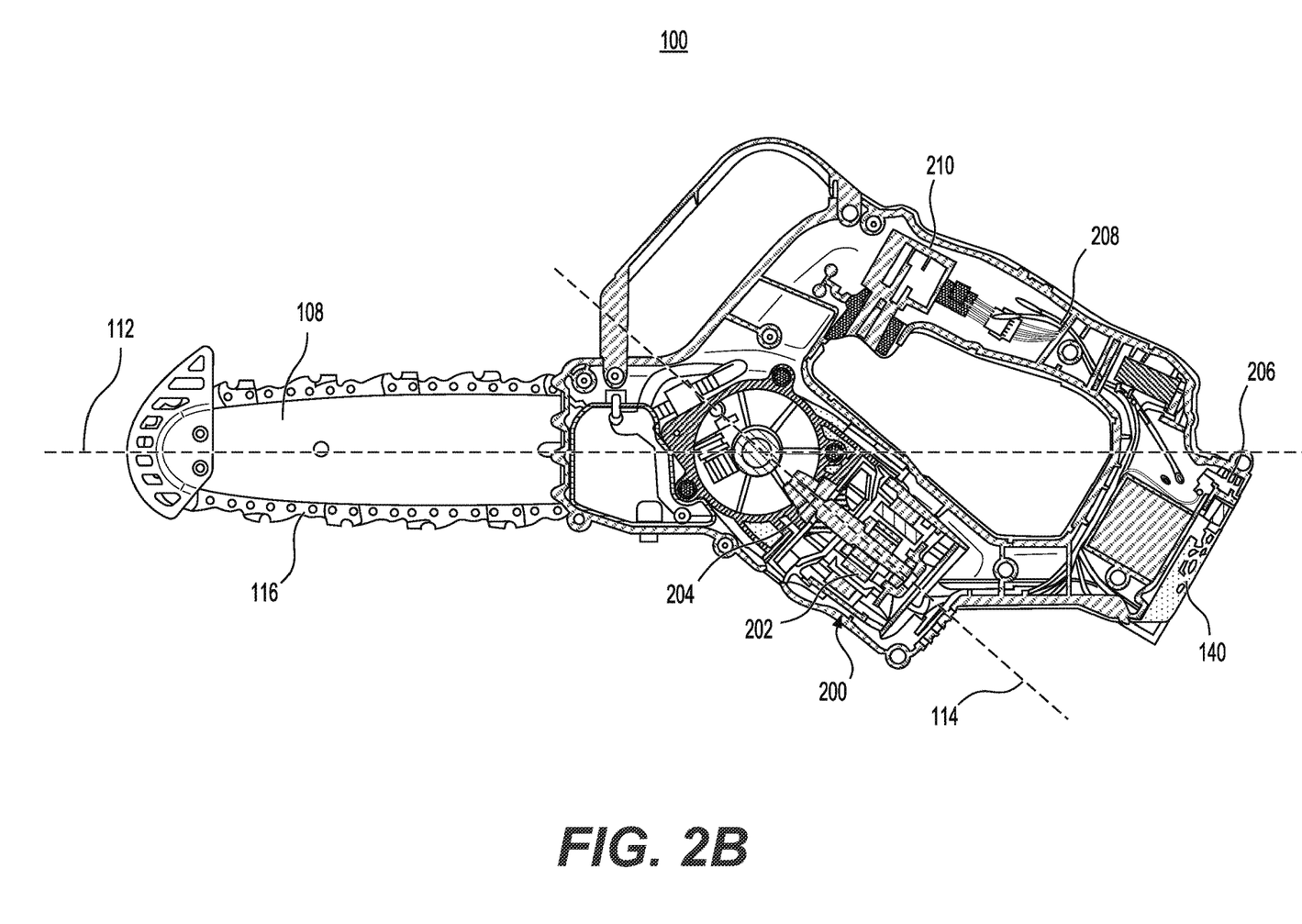
FIG. 2B depicts a cross-sectional side view of the power tool depicted in FIG. 1, according to an embodiment of the present disclosure.

In some examples, and as shown in FIGS. 1, 2A, and 2B, the power tool 100 may include an optional tip guard 122 mounted to an end of the guide bar 108. As shown, the tip guard 122, when included, may be mounted to an end of the guide bar 108 that extends distally from where the guide bar 108 is connected to the chassis 110. The tip guard 122 may be mounted to the guide bar 108 through use of mechanical fasteners such as screws, bolts and nuts, rivets, and/or the like.

The chassis 110 may include a relatively rigid hollow body that may house components of the power tool 100, such as a motor, gears, drive shafts, circuits, switches, wires, etc., as shown in FIG. 2B. In some examples, the chassis 110 may be formed of a plastic, rubber, composite, metal, and/or the like, material. The chassis 110 may also be formed of multiple sections that may be connected together to house the components. Additional components of the power tool 100 may be attached to the chassis 110. For instance, the handle 102 may be attached to the chassis 110 or formed with the chassis 110. As shown in FIG. 2A, the handle 102 may be attached at two portions 124, 126 on the chassis 110. For instance, a front section of the handle 102 may be attached to an upper portion 124 of the chassis 110, near a front of the chassis 110. In addition, a rear section of the handle 102 may be attached to a rear portion 126 of the chassis 110. The front of the chassis 110 may be defined as a section of the chassis 110 that is closest to the guide bar 108 and the rear of the chassis 110 may be defined as a section of the chassis 110 that is furthest from the guide bar 108. In some examples, the handle 102 may be positioned near the rear of the chassis 110 to oppose the moment about a certain location of the power tool 100, e.g., a location near the trigger mechanism 104, induced by the guide bar 108 and the chain 116.

In the example shown in FIGS. 1 and 2A, the handle 102 may be formed of multiple portions. For instance, the handle 102 may include a primary handle portion 130 and a secondary handle portion 132. The trigger mechanism 104 may movably be mounted to the primary handle portion 130. An operator may grip the primary handle portion 130 with their primarily used hand during use. For instance, an operator may, while holding the primary handle portion 130, press the trigger mechanism 104 to cause a motor switch 210 to apply electrical energy to the motor 200, which causes the rotor 202 in the motor 200 to rotate.

The primary handle portion 130 may be positioned at an angle that is relatively similar to the angle at which the central axis 114 of the motor may be positioned. By way of particular example, an angle 133 between the central axis 114 of the motor and the central axis 112 of the guide bar 108 may be between about 20 and about 60 degrees. Additionally, an angle 134 between a central axis (denoted by dashed line 136) of the primary handle portion 130 and the central axis 112 of the guide bar 108 may be between about 5 and about 60 degrees.

The secondary handle portion 132 may be attached to the upper portion 124 of the chassis 110 at one end thereof and to the primary handle portion 130 at the opposite end thereof. Additionally, the secondary handle portion 132 may be angled with respect to the primary handle portion 130. For instance, the secondary handle portion 132 may extend at an angle that is substantially perpendicular to the central axis 136 of the primary handle portion 132. By way of example, the angle between the secondary handle portion 132 and the primary handle portion 130 facing the chassis 110 may be between about 60 degrees and about 150 degrees. The secondary handle portion 132 may also be substantially shorter in length than the primary handle portion 130. An operator may grip the secondary handle portion 132 with their secondarily used hand during use of the power tool 100.

The handle 102 may additionally include a tertiary handle portion 138 that extends from the primary handle portion 130 to the chassis 110. In this regard, the tertiary handle portion 138 includes an angled section because the primary handle portion 130 extends beyond the chassis 110 in the X direction. Additionally, a battery pack mount 140 may be formed on the tertiary handle portion 138 of the handle 102. In some examples, the battery pack mount 140 may integrally be formed with the tertiary handle portion 138, e.g., molded with or into the tertiary handle portion 138. In other examples, the battery pack mount 140 may be formed separately from the tertiary handle portion 138 and may be attached to the battery pack mount 140 through welds, mechanical fasteners, snap-fit through mating features, etc.

In any of these examples, the battery pack mount 140 may include features such as tabs, grooves, or the like, that may mate with mating features such as tabs, grooves, or the like, included on a battery pack 142. The battery pack mount 140 may also include electrical connectors to electrically connect to the battery pack 142. A battery pack 142 may releasably be mounted to the battery pack mount 140 to supply energy to the motor and other components inside of the power tool 100. The battery pack 142 or the battery pack mount 140 may include a release button (not shown) that an operator may press to release the battery pack 142 from the battery pack mount 140. As discussed herein, the power tool 100 may substantially be laterally and longitudinally balanced about a certain location, e.g., a bottom portion 106 of the trigger mechanism 104, when the battery pack 142 is mounted to the battery pack mount 140.

According to examples, the secondary handle portion 132 and the tertiary handle portion 138 may integrally be formed with the primary handle portion 130. In other examples, either or both of the secondary handle portion 132 and the tertiary handle portion 138 may separately be formed from the primary handle portion 130. In these examples, either or both of the secondary handle portion 132 and the tertiary handle portion 138 may be attached to the primary handle portion 130 in any suitable manner, e.g., through use of mechanical fasteners, adhesives, welds, and/or the like.

In some examples, the handle 102 may integrally be formed with the chassis 110. In these examples, the chassis 110 and the handle 102 may be formed of a first shell and a second shell that may be joined together through use of mechanical fasteners such as screws, mating tabs and grooves, adhesives, welds, and/or the like. In other examples, the handle 102 may separately be formed from the chassis 110. In these examples, the handle 102 may be attached to the chassis 110 at the upper portion 124 and the rear portion 126 of the chassis 110 through use of mechanical fasteners, adhesives, welds, and/or the like.

In any of these examples, the handle 102 may be composed of a material that differs from the chassis 110. For instance, the handle 102 may be formed of a rubber material while the chassis 110 may be formed of a plastic material. In other examples, the handle 102 may be composed of the same material as the chassis 110. In any of these examples, the handle 102 may be provided with a grip attachment that is formed of a material that may improve an operator's grip on the handle 102. The grip attachment may be formed of rubber, plastic, foam, leather, or the like. In any of these examples, the handle 102 may be shaped to fit in an operator's hand.

As further shown in FIGS. 1 and 2A, the power tool 100 may include an upper hand guard 144 attached to the handle 102 and the chassis 110. Particularly, the upper hand guard 144 may be spaced from and may cover the secondary handle portion 132. In addition, a large portion of the upper hand guard 144 may extend parallel to the secondary handle portion 132. The upper hand guard 144 may further have a sufficient width to protect an operator's hand when the operator's hand is positioned on the secondary handle portion 132. For instance, the upper hand guard 144 may protect the operator's hand from being hit by the chain 116 should the chain 116 break or otherwise become separated from the guide bar 108. The upper hand guard 144 may be made of a relatively rigid material, such as plastic, metal, and/or the like, to withstand an impact from the chain 116.

Turning now to FIG. 2B, there is shown a cross-sectional side view of the power tool 100 depicted in FIG. 2A. The cross-sectional side view of FIG. 2B differs from FIG. 2A in that the battery pack 142 is omitted from that view. Additionally, FIG. 2B shows a motor 200 positioned within the chassis 110, in which the motor 200 may include a rotor 202 and a drive shaft 204, among a number of other components. The motor 200 is oriented such that the central axis 114 of the motor 200, which may equivalently be denoted as an axis of rotation 114 of the rotor and the drive shaft 204, extends at an angle with respect to the central axis 112 of the guide bar 108. The motor 200 is also positioned beneath the central axis 112 of the guide bar 108.

Also shown in FIG. 2B are electrical connectors 206 in the battery pack mount 140 to which mating electrical connectors on the battery pack 142 may be connected. Electrical energy may be directed to the motor 200 through wires 208 when, for instance, the trigger mechanism 104 is depressed to activate a switch 210. When the electrical energy is provided to the motor 200, the rotor 202 may rotate with respect to the chassis 110, which may cause the drive shaft 204 to rotate. Additionally, rotation of the drive shaft 204 may cause additional gears, e.g., a gear transmission to rotate.

Figure 3:
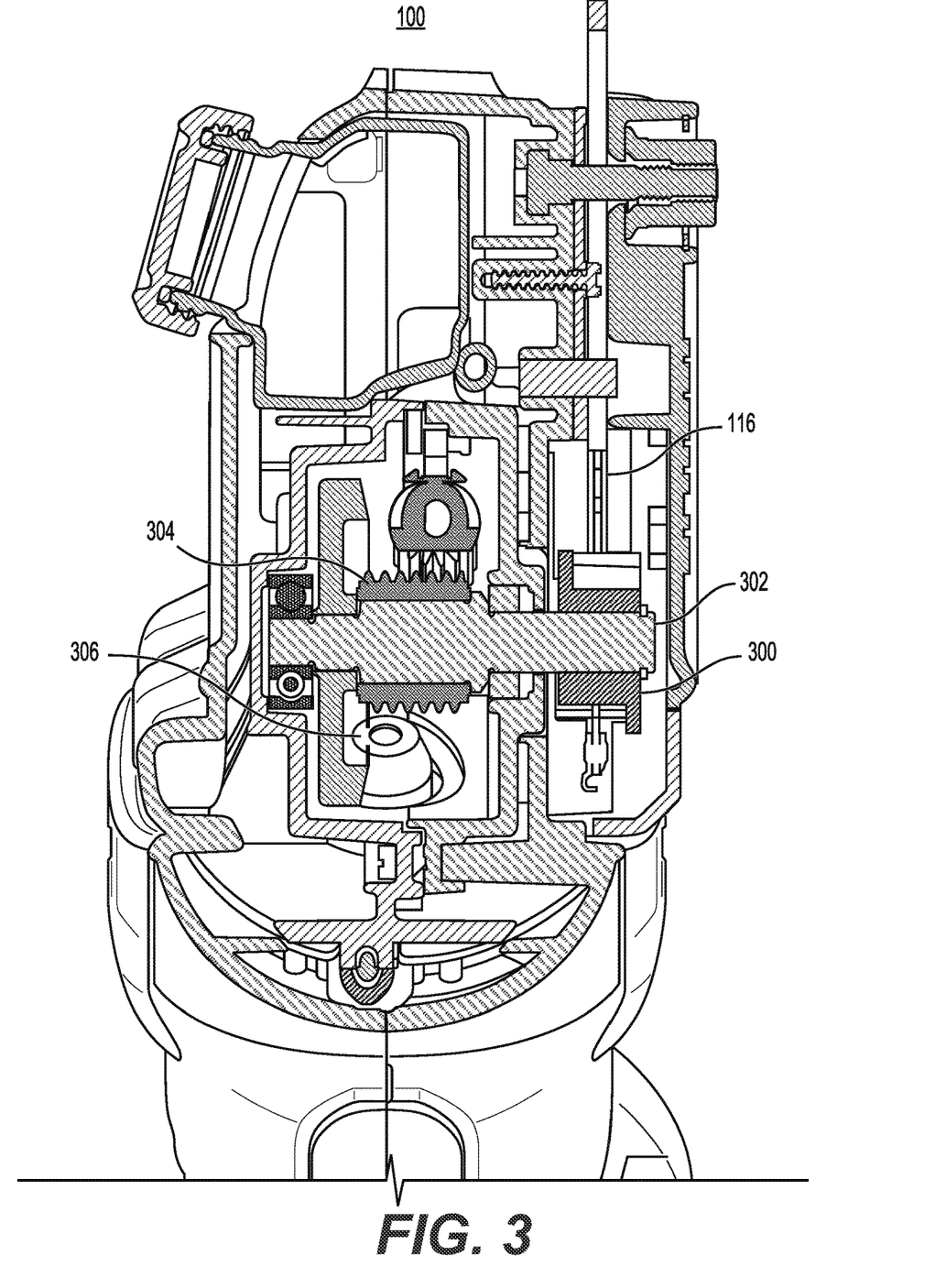
FIG. 3 shows a top perspective view of a section of the power tool depicted in FIG. 1, partially in cross section, in accordance with an embodiment of the present disclosure.

Reference is now made to FIG. 3, which shows a top perspective view of a section of the power tool 100, partially in cross section, in accordance with an embodiment of the present disclosure. As shown in FIG. 3, the chain 116 may engage a sprocket 300. For instance, the sprocket 300 may include teeth that may be inserted within openings in the links 118 of the chain 116. The sprocket 300 may be connected to a drive member 302, which may include a gear 304. The gear 304 may engage another gear 306, which may be connected to the drive shaft 204 (shown in FIG. 2B). As a result, rotation of the drive shaft 204 by the motor 200 may cause the chain 116 to be driven around the guide bar 108. In some examples, the motor 200 may include a bevel gear transmission, a worm gear transmission, a belt/chain transmission, or the like.

Figure 4:
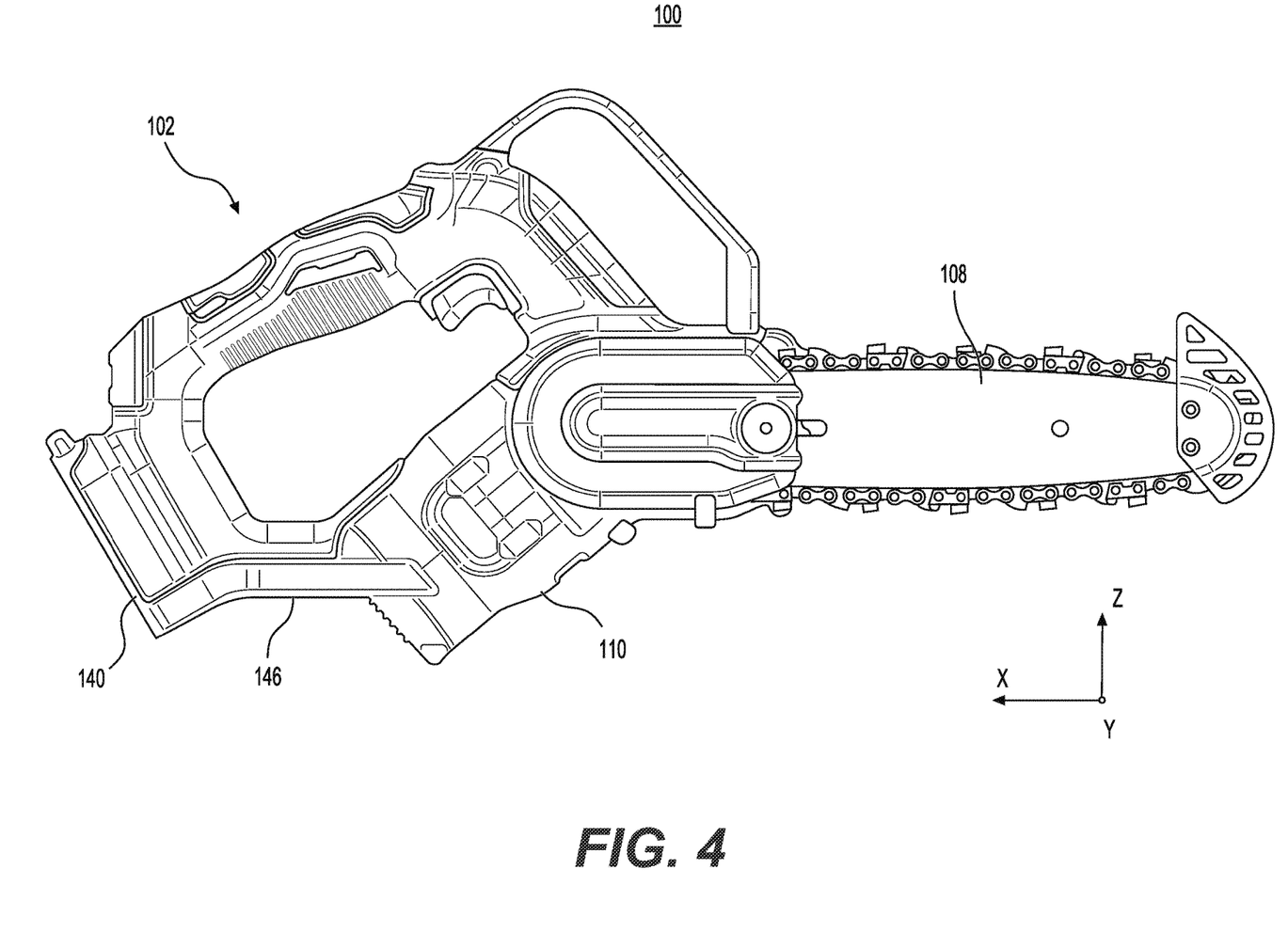
FIG. 4 depicts a side elevation view of the power tool depicted in FIG. 1, according to an embodiment of the present disclosure

Reference is now made to FIG. 4, which depicts a side elevation view of the power tool 100 depicted in FIG. 1, according to an embodiment of the present disclosure. FIG. 4 is similar to FIG. 2A, but shows the opposite side of the power tool 100. Additionally, FIG. 4 differs from FIG. 2A in that the battery pack 142 is omitted from the power tool 100. FIG. 4 also shows that the power tool 100 may include a lower hand guard 146 extending from the chassis 110 to the battery pack mount 140. The lower hand guard 146 may have a sufficient width to protect an operator's hand when the operator's hand is positioned on the primary handle portion 130. For instance, the lower hand guard 146 may protect the operator's hand from being hit by the chain 116 should the chain 116 break or otherwise become separated from the guide bar 108. The lower hand guard 146 may be made of a relatively rigid material, such as plastic, metal, and/or the like, to withstand an impact from the chain 116.

Figure 5:
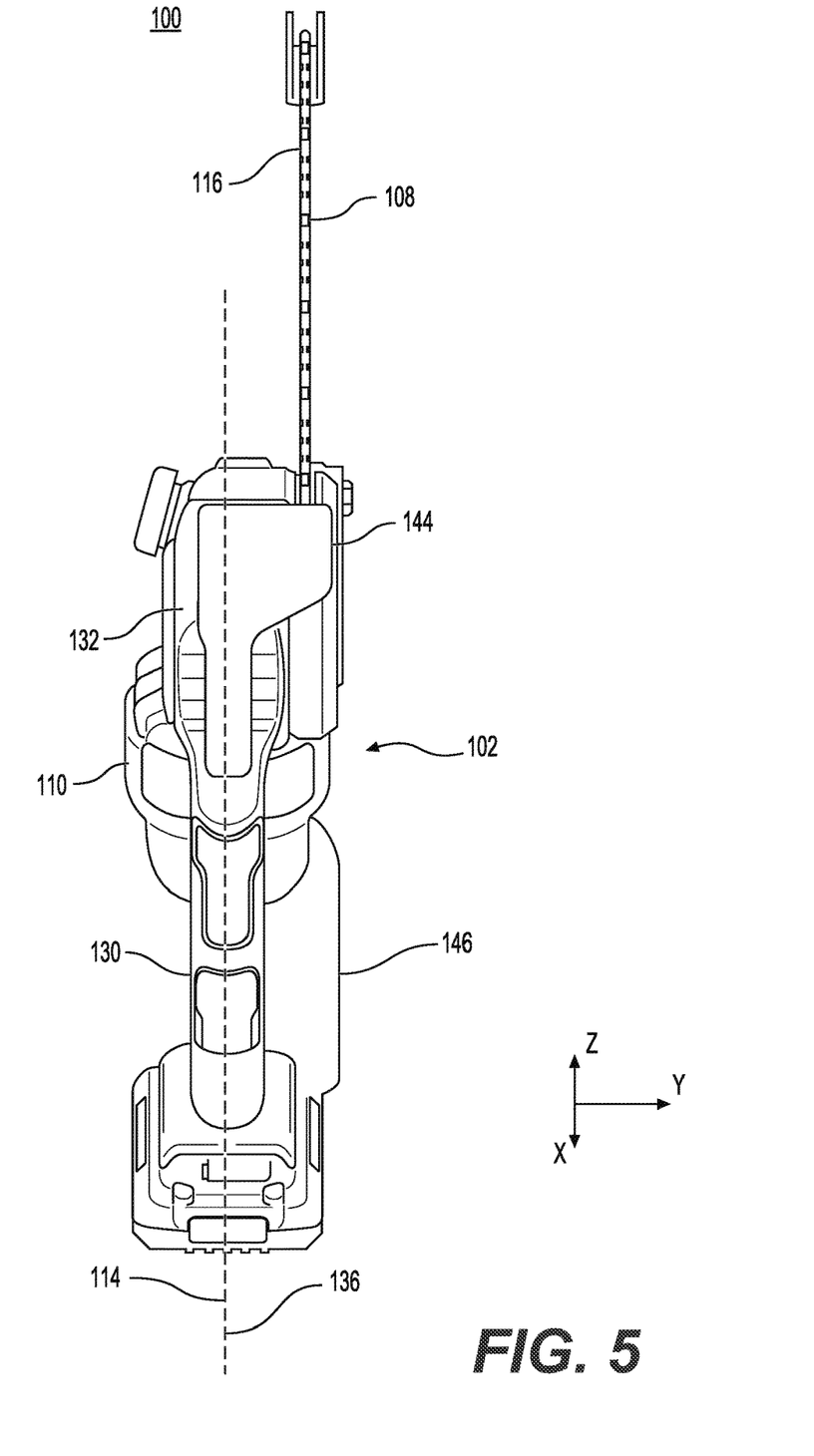
FIG. 5 shows a top perspective view of the power tool depicted in FIG. 1, according to an embodiment of the present disclosure.

Turning now to FIG. 5, there is shown a top perspective view of the power tool 100 depicted in FIG. 1 according to an embodiment of the present disclosure. As more clearly shown in FIG. 5, the guide bar 108 and the chain 116 are offset in the Y direction from the central axes 114, 136 of the motor 200 and the handle 102. In addition, both the upper hand guard 144 and the lower hand guard 146 may extend in the Y direction from the central axis 136 of the handle 102, e.g., in the direction of the guide bar 108 and chain 116. In addition, the upper hand guard 144 and the lower hand guard 146 may be sized and positioned to protect the operator's hand during use, should the chain 116 break or otherwise become disengaged from the guide bar 108.

As shown in FIG. 5, the central axis 136 of the handle 102 may extend along a vertical plane (e.g., along the Z direction), that is substantially parallel to a vertical plane of the central axis 112 of the guide bar 108. In some examples, the central axis 114, e.g., the axis of rotation, of the motor 200 may extend along a vertical plane that is aligned with the vertical plane of the central axis 136 of the handle 102. In other examples, the vertical plane of the central axis 114 of the motor 200 may be offset with respect to the vertical plane at which the central axis 136 of the handle 102 extends. Examples in which the vertical plane of the central axis 114 of the motor 200 is offset with respect to the vertical plane at which the central axis 136 of the handle 102 extends are shown in FIGS. 6A and 6B.

Figure 6A:
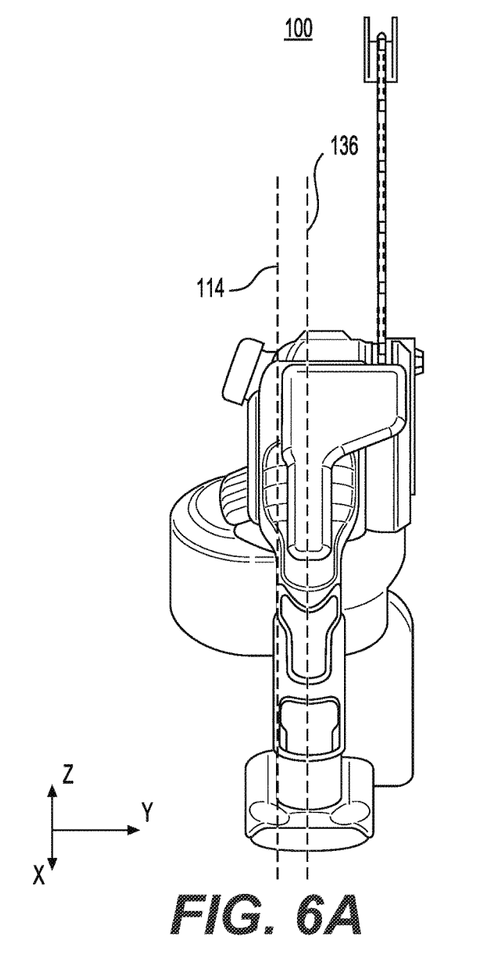
FIGS. 6A and 6B, respectively show top perspective views of the power tool depicted in FIGS. 1-3 according to embodiments of the present disclosure.
Figure 6B:
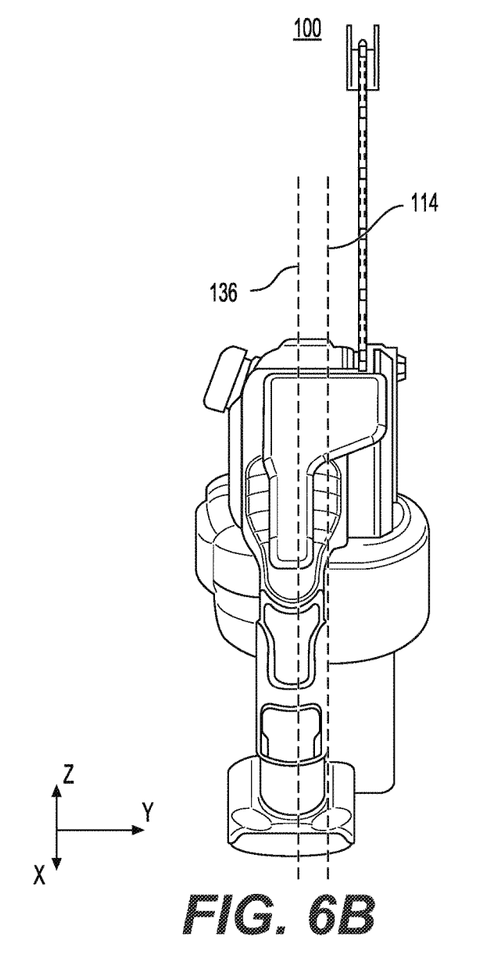

FIGS. 6A and 6B, respectively show top perspective views of the power tool 100 depicted in FIGS. 1-3 according to embodiments of the present disclosure. Particularly, FIG. 6A depicts an example in which the vertical plane of the central axis 114 of the motor 200 is offset to the left, e.g., in the negative Y direction, with respect to the vertical plane of the central axis 136 of the handle 102. By way of particular example, the offset may be a distance that is between about 1 mm to about 10 mm. By offsetting the central axis 114 of the motor 200 with respect to the central axis 136 of the handle 102 in this manner, the center of mass of the power tool 100 may be moved slightly left, which may compensate for a tipping moment induced by the guide bar 108 and the chain 116. Additionally, the offset of the motor 200 may compensate for moment induced by a cutpiece in an undercut movement of the power tool 100.

FIG. 6B depicts an example in which the vertical plane of the central axis 114 of the motor 200 is offset to the right, e.g., in the positive Y direction, with respect to the vertical plane of the central axis 136 of the handle 102. By way of particular example, the offset may be a distance that is between about 1 mm to about 10 mm. By offsetting the central axis 114 of the motor 200 with respect to the central axis 136 of the handle 102 in this manner, the center of mass of the power tool 100 may be moved slightly right, which may compensate for moment induced by a cutpiece in an overcut movement of the power tool 100.

Figure 7:
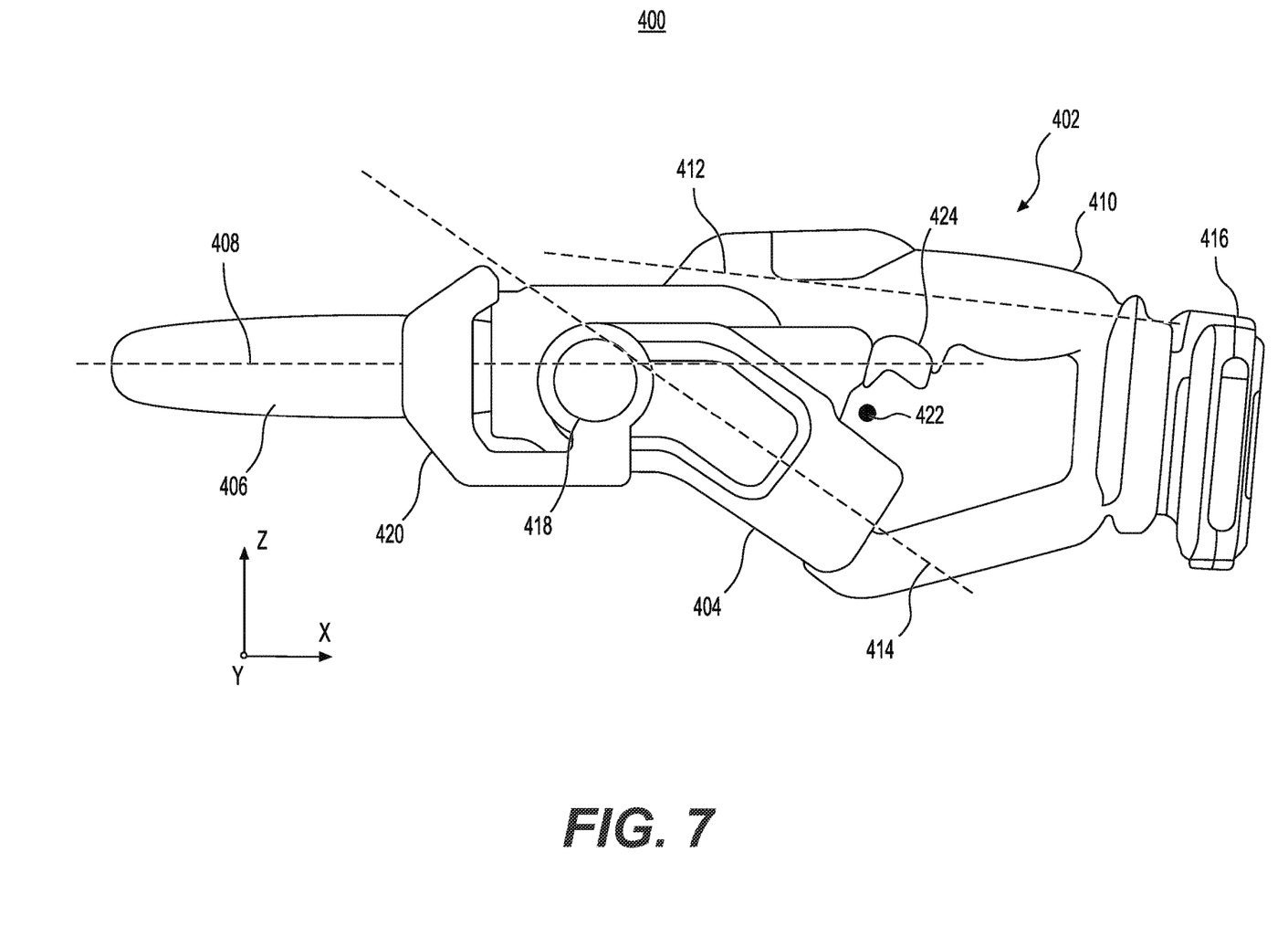
FIG. 7 shows a side elevation view of a power tool, according to an embodiment of the present disclosure.

Turning now to FIG. 7, there is shown a side elevation view of a power tool 400, according to an embodiment of the present disclosure. The power tool 400 may include a handle 402, which may be attached to a chassis 404. The power tool 400 may also include a guide bar 406 that may be mounted to the chassis 404. The handle 402 may be attached to the chassis 404 and the guide bar 406 may be mounted to the chassis 404 in any of the manners discussed above with respect to the power tool 100.

As shown in FIG. 7, the guide bar 406 may include a central axis (denoted by the dashed line 408) that may extend along a longitudinal axis of the power tool 400, e.g., along the X direction. In addition, the handle 402, or more particularly, a primary handle portion 410 of the handle 402, may be attached to the chassis 404 above the central axis 408 of the guide bar 406. The primary handle portion 410 may also extend at an angle (as denoted by the dashed line 412), in which the angle differs from the angle at which the central axis 408 of the guide bar 406 extends.

The power tool 400 may also include a motor housed within the chassis 404 to drive a chain around the guide bar 406. The motor may be configured and positioned similarly to the motor 200 of the power tool 100 as depicted in FIG. 2B. In this regard, the motor 200 may be positioned beneath the central axis 408 of the guide bar 406 and a central axis (as denoted by the dashed line 414) of the motor may be at a certain angle with respect to the central axis 408 of the guide bar 406. The angle between the central axis 414 of the motor and the central axis 408 of the guide bar 406 may be equivalent to the angle between the central axis 114 of the motor 200 and the central axis 112 of the guide bar 108 of the power tool 100 as depicted in FIG. 2B.

The power tool 400 depicted in FIG. 4 may differ from the power tool 100 depicted in FIGS. 1-5 in that the primary handle portion 410 of the handle 402 may extend at a relatively shallower angle as compared with the primary handle portion 130 of the handle 102. Additionally, the power tool 400 may include a battery pack 416 releasably mounted to a battery pack mount formed on a portion of the handle 402. The battery pack 416 may be positioned closer to the central axis 408 of the guide bar 406 as compared with the battery pack 142 of the power tool 100. Similarly to the power tool 100, the power tool 400 may include a secondary handle 418 and a front hand guard 420. The secondary handle 418 and the front hand guard 420 may extend from the chassis 404 in the Y direction. Although not shown, the power tool 400 may include a lower hand guard that may extend in the negative Y direction from the chassis 404. The front hand guard and the lower hand guard may be positioned to protect an operator's hands from being hit by the chain should the chain break or otherwise become separated from the guide bar 406.

In some examples, the center of mass of the power tool 400 may be positioned beneath a trigger 424 as denoted by the circle 422. The center of mass may, however, be located at other positions with respect to the trigger 424 based on, for instance, different battery sizes.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A power tool comprising:
a chassis;
a guide bar mounted to the chassis, the guide bar having a central axis;
a handle attached to the chassis and including a trigger mechanism positioned on a primary handle portion of the handle, the handle having a central axis along the primary handle portion of the handle;
a motor housed within the chassis to drive a chain around the guide bar, the motor having a central axis along an axis of rotation of the motor; and
a battery pack mount attached to one end of the handle, wherein the primary handle portion of the handle is positioned on one side of the central axis of the guide bar, and the motor and the battery pack mount are positioned on another side of the central axis of the guide bar opposite the one side, and
wherein a vertical plane of the central axis of the motor and a vertical plane of the central axis of the handle are parallel and offset from each other.

2. The power tool of claim 1, further comprising:
a battery pack releasably mounted to the battery pack mount on the other side of the central axis of the guide bar.

3. The power tool of claim 1, wherein the primary handle portion of the handle, the motor, and the battery pack mount are positioned with respect to the central axis of the guide bar to cause a center of mass location of the power tool to be at or adjacent to the trigger mechanism.

4. The power tool of claim 1, wherein an angle of the central axis of the motor is between 20 and 60 degrees with respect to the central axis of the guide bar.

5. The power tool of claim 1, wherein the central axis of the handle is positioned at an angle that is between 5 and 60 degrees with respect to the central axis of the guide bar.

6. The power tool of claim 1, further comprising:
a tip guard mounted to an end of the guide bar distally from the chassis.

7. The power tool of claim 1, wherein the handle comprises a a secondary handle portion, wherein the secondary handle portion is attached to the chassis at a proximal end of the secondary handle portion and is attached to the primary handle portion at a distal end of the secondary handle portion.

8. The power tool of claim 7, further comprising:
a first hand guard attached to the chassis parallel to the secondary handle portion; and
a second hand guard attached to the chassis, extending from the chassis to the battery pack mount.

9. A chainsaw comprising:
a chassis;
a guide bar mounted to the chassis, the guide bar having a central axis, wherein the guide bar is to guide a chain;
a handle attached to the chassis on one side of the central axis of the guide bar, wherein the handle includes a central axis along a primary handle portion of the handle;
a motor housed within the chassis, the motor to drive the chain around the guide bar, wherein the motor includes a central axis along an axis of rotation of the motor; and
a battery pack mount attached to one end of the handle, wherein the primary handle portion of the handle is positioned on one side of the central axis of the guide bar, and the motor and the battery pack mount are positioned on another side of the central axis of the guide bar opposite the one side, and wherein a vertical plane of the central axis of the motor and a vertical plane of the central axis of the handle are parallel and offset from each other.

10. The chainsaw of claim 9, further comprising:

a battery pack releasably mounted to the battery pack mount, wherein the battery pack is positioned on the other side of the central axis of the guide bar.

11. The chainsaw of claim 10, further comprising:

a trigger mechanism movably mounted to the primary handle portion of the handle, wherein the primary handle portion of the handle, the motor, and the battery pack mount are positioned with respect to the central axis of the guide bar to cause a center of mass of the chainsaw to be located at or adjacent the trigger mechanism.

12. The chainsaw of claim 10, wherein the battery pack mount is formed on a tertiary handle portion of the handle positioned at an angle that is substantially perpendicular to the primary handle portion of the handle.

13. The chainsaw of claim 9, wherein the vertical plane of the central axis of the handle is parallel to a vertical plane of the central axis of the guide bar.

14. The chainsaw of claim 9, further comprising:

a tip guard mounted to an end of the guide bar distally from the chassis.

15. The chainsaw of claim 9, wherein the handle comprises a secondary handle portion, wherein the secondary handle portion is attached to the chassis at a proximal end of the secondary handle portion and is attached to the primary handle portion at a distal end of the secondary handle portion.

16. The chainsaw of claim 15, further comprising:

a first hand guard attached to the chassis in parallel with the secondary handle portion; and a second hand guard attached to the chassis, extending from the chassis to the battery pack mount.

* * * * *